US012659021B2

(12) United States Patent
Jung et al.

(10) Patent No.: US 12,659,021 B2
(45) Date of Patent: Jun. 16, 2026

(54) SATELLITE CLUSTER SYSTEM

(71) Applicant: Electronics and Telecommunications Research Institute, Daejeon (KR)

(72) Inventors: Dong Hyun Jung, Daejeon (KR); Gyeong Rae Im, Daejeon (KR); Joon Gyu Ryu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 469 days.

(21) Appl. No.: 17/978,579

(22) Filed: Nov. 1, 2022

(65) Prior Publication Data

US 2023/0137974 A1    May 4, 2023

(30) Foreign Application Priority Data

Nov. 2, 2021    (KR) ......................... 10-2021-0149091
Sep. 26, 2022    (KR) ......................... 10-2022-0121521

(51) Int. Cl.
H04B 7/185        (2006.01)

(52) U.S. Cl.
CPC ..... H04B 7/18521 (2013.01); H04B 7/18519 (2013.01)

(58) Field of Classification Search
CPC ............... H04B 7/18521; H04B 7/185; H04B 7/18519; H04B 7/1851; H04B 7/18513
See application file for complete search history.

(56) References Cited

U.S. PATENT DOCUMENTS

| | | | |
|---|---|---|---|
| 7,113,493 B1 * | 9/2006 | Bush ................... | H04L 41/0803 |
| | | | 370/325 |
| 7,554,937 B2 | 6/2009 | Lim et al. | |
| 9,882,632 B1 | 1/2018 | Fang | |
| 10,798,624 B2 | 10/2020 | Byun et al. | |
| 10,965,779 B2 | 3/2021 | Coleman et al. | |
| 11,277,194 B2 | 3/2022 | Sohn | |
| 2018/0254824 A1 * | 9/2018 | Speidel ............. | H04B 7/18532 |
| 2020/0068639 A1 | 2/2020 | Kim et al. | |
| 2021/0231813 A1 | 7/2021 | Camparo et al. | |
| 2021/0281318 A1 * | 9/2021 | Chen ................... | H04B 7/18521 |
| 2021/0392710 A1 | 12/2021 | Yang et al. | |
| 2022/0104233 A1 * | 3/2022 | Jeon ..................... | H04L 5/0051 |
| 2023/0022283 A1 * | 1/2023 | Wigard ............. | H04B 7/18513 |

OTHER PUBLICATIONS (DE 4313945 A1), Westphal,vMethod and devices for disseminating standard time information, Nov. 1994, pp. 1-5 (Year: 1994).*
(FR 3056305 A1), Marmet, Flight in training of aeropatial vehicles, Mar. 2018, pp. 1-9 (Year: 2018).*

(Continued)

*Primary Examiner* — Keith Ferguson
(74) *Attorney, Agent, or Firm* — KILE PARK REED & HOUTTEMAN PLLC

(57) ABSTRACT

A satellite cluster system may comprise: at least one slave satellite; a master satellite sharing a control signal and an information signal with the at least one slave satellite through an inter-satellite link; and a terrestrial control system for adjusting positions of the master satellite and the at least one slave satellite and transmitting the control signal and the information signal to the master satellite.

7 Claims, 7 Drawing Sheets

(56)            References Cited

OTHER PUBLICATIONS (EP 2530022 A1), Peyrotte et al., System For Geographical Positioning Of Backup Beacon Detection-type Terrestrial Transmitter Located On Surface Of Earth, Has Determining Unit To Determine Absolute Position Of Satellite, Dec. 2012, pp. 1-6 (Year: 2012).*

(CN 108382608 A), Sun et al., Earth Observation Nano Satellite Cluster System With Free Reconstruction And Cooperative Observation, Aug. 2018, pp. 1-8 (Year: 2018).*

(CN 112615662 A), Shen et al., Data Transmission Method Of MAC Layer Of Low-orbit Satellite, Apr. 2021, pp. 1-6 (Year: 2021).*

(CN 112564770 A), Huang et al., Multisatellite co-located satellite communication system, Mar. 2021, pp. 1-3 (Year: 2021).*

* cited by examiner

FIG. 1

140 DATA NETWORK

130

FEEDER LINK

110

SERVICE LINK

120

FOOTPRINT OF BEAM

SATELLITE CLUSTER SYSTEM

CROSS-REFERENCE TO RELATED APPLICATIONS

This application claims priority to Korean Patent Application No. 10-2021-0149091, filed on Nov. 2, 2021, and Korean Patent Application No. 10-2022-0121521, filed on Sep. 26, 2022, with the Korean Intellectual Property Office (KIPO), the entire contents of which are hereby incorporated by reference.

BACKGROUND

1. Technical Field

The present disclosure relates to a satellite cluster technology, and more particularly, to a satellite cluster technology capable of communicating with a plurality of terminals by forming a cluster of a plurality of satellites.

2. Related Art

With the development of information and communication technologies, various wireless communication technologies are being developed. As the representative wireless communication technologies, there may be long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies. For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Meanwhile, the NR communication network may provide a communication service to terrestrial terminals. Recently, as well as on the ground, the demand for communication services for airplanes, drones, satellites, etc. located in non-terrestrial is increasing, and for this purpose, technologies for non-terrestrial network (NTN) are being discussed. The NTN may be implemented based on the NR technology. For example, in the NTN, communication between a satellite and a terrestrial communication node or a non-terrestrial communication node (e.g., airplane, drone, etc.) may be performed based on the NR technology. In the NTN, a satellite may perform a function of a base station in the NR communication network.

A large number of low earth orbit (LEO) satellites have been launched for non-terrestrial networks. And, within years, more LEO satellites could be launched by global companies (e.g., OneWeb, Space-X, Telesat, and Amazon). However, as the number of satellites increases, network performance may significantly decrease due to inter-satellite interference.

SUMMARY

In order to solve the above problems, it is an object of the present disclosure to provide a satellite cluster system capable of communicating with a plurality of terminals by forming a cluster of a plurality of satellites.

According to a first exemplary embodiment of the present disclosure, a satellite cluster system may comprise: at least one slave satellite; a master satellite sharing a control signal and an information signal with the at least one slave satellite through an inter-satellite link; and a terrestrial control system for adjusting positions of the master satellite and the at least one slave satellite and transmitting the control signal and the information signal to the master satellite.

The inter-satellite link may comprise a radio frequency communication or a visual light communication.

The master satellite and the at least one slave satellite may have an identical altitude and form a cluster area in a shape of a spherical cap, the master satellite may be positioned at a center of the cluster area, and the master satellite and each slave satellite may have an equal distance therebetween.

The master satellite and the at least one slave satellite may have an identical altitude and form a cluster area in a shape of a spherical cap, the master satellite may be positioned at a center of the cluster area, the at least one slave satellite may be uniformly distributed in the cluster area, and the master satellite and each slave satellite may have a different distance therebetween.

The master satellite and the at least one slave satellite may have a different altitude and form a cluster area in a shape of a circular band.

The master satellite and the at least one slave satellite may have a different altitude and form a cluster area in a shape of a spherical shell.

The master satellite and the at least one slave satellite may provide a terminal with a signal using a joint transmission (JT) method or a dynamic point selection (DPS) method, as a cooperative multi-point (CoMP) communication technology.

The at least one slave satellite may support lower functions of a physical (PHY) layer (PHY-lower) including at least one of an orthogonal frequency division multiplexing (OFDM) modulation/demapping function, a resource element (RE) mapping/demapping function, or a radio frequency (RF) function, and the master satellite may support upper functions of the PHY layer (PHY-upper).

The master satellite may be responsible for at least one of a radio resource control (RRC) layer, a packet data convergence protocol (PDCP) layer, a radio link control (RLC) layer, or an upper portion of a media access control (MAC) layer, and the at least one slave satellite may be responsible for at least one of a lower portion of the MAC layer, a physical (PHY) layer, or an RF portion.

The master satellite may be responsible for at least one of a radio resource control (RRC) layer or a packet data convergence protocol (PDCP) layer, and the at least one slave satellite may be responsible for a radio link control (RLC) layer, a media access control (MAC) layer, a physical (PHY) layer, or a radio frequency portion.

According to the present disclosure, a master satellite is capable of constituting a satellite cluster system along with at least one slave satellite sharing control and information signals. In addition, according to the present disclosure, a master satellite and at least one slave satellite may form a single altitude satellite cluster by maintaining the same altitude. In addition, according to the present disclosure, a master satellite and at least one slave satellite may form a multi-altitude satellite cluster by maintaining different altitudes.

In addition, the satellite cluster system according to the present disclosure is advantageous in terms of cooperation with terrestrial networks by configuring at least one slave satellite to a lower portion of a physical (PHY) layer (PHY-lower) including at least one of an orthogonal frequency division multiplexing (OFDM) modulation, resource element (RE) mapping/demapping, or radio frequency (RF) part, and by configuring the master satellite to have upper portion of the PHY layer (PHY-upper), which is advantageous in terms of cooperation with terrestrial networks.

The satellite cluster system according to the present disclosure is also advantageous in terms of mitigating the constraint of the front pole capacity and improving reliability by configuring the master satellite to be responsible for at least one of the upper portions of a radio resource control(RRC) layer, a packet data convergence protocol (PDCP) layer, a radio link control (RLC) layer, or a media access control (MAC) layer, and by configuring at least one slave satellite to be responsible for at least one of the lower portion of the MAC layer or a PHY layer or RF part.

The satellite cluster system according to the present disclosure is also advantageous in terms of mitigating transmission capacity and latency requirements for an inter-satellite link by configuring the master satellite to be responsible for at least one of an RRC layer or a PDCP layer, and by configuring at least one slave satellite to be responsible for at least one of the RLC layer, the MAC layer, and the PHY layer or an RF portion.

BRIEF DESCRIPTION OF DRAWINGS

FIG. 1 is a conceptual diagram illustrating a first exemplary embodiment of a non-terrestrial network.

FIG. 2 is a conceptual diagram illustrating a second exemplary embodiment of a non-terrestrial network.

FIG. 9 is a block diagram illustrating a protocol architecture of a satellite cluster system according to the first exemplary embodiment.

DETAILED DESCRIPTION OF THE EMBODIMENTS

Figure 3:
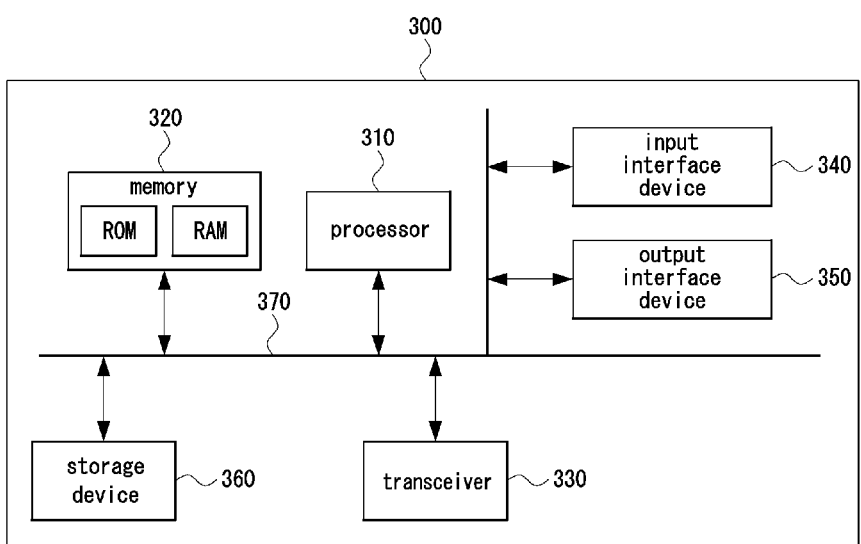
FIG. 3 is a block diagram illustrating a first exemplary embodiment of an entity constituting a non-terrestrial network.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

A communication network to which exemplary embodiments according to the present disclosure are applied will be described. The communication system may be a non-terrestrial network (NTN), a 4G communication system (e.g., long-term evolution (LTE) communication network), a 5G communication network (e.g., new radio (NR) communication network), a B5G communication network (e.g., 6G mobile communication network), or the like. The 4G communication network and the 5G communication network may be classified as terrestrial networks.

The NTN may operate based on the LTE technology and/or the NR technology. The NTN may support communications in frequency bands below 6 GHz as well as in frequency bands above 6 GHz. The 4G communication network may support communications in the frequency band below 6 GHz. The 5G communication network may support communications in the frequency band below 6 GHz as well as in the frequency band above 6 GHz. The communication network to which the exemplary embodiments according to the present disclosure are applied is not limited to the contents described below, and the exemplary embodiments according to the present disclosure may be applied to various communication networks. Here, the communication network may be used in the same sense as the communication system.

Figure 1:
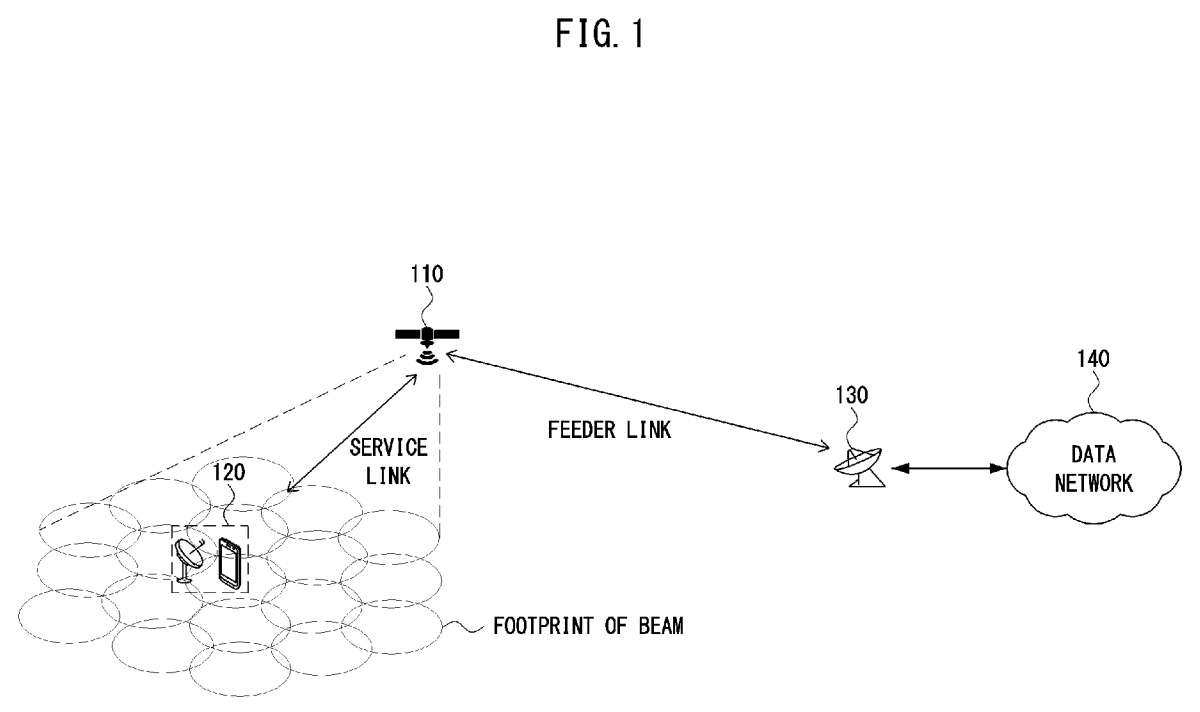

FIG. 1 is a conceptual diagram illustrating a first exemplary embodiment of a non-terrestrial network.

Referring to FIG. 1, a non-terrestrial network (NTN) may include a satellite 110, a communication node 120, a gateway 130, a data network 140, and the like. The NTN shown in FIG. 1 may be an NTN based on a transparent payload. The satellite 110 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS).

The communication node 120 may include a communication node (e.g., a user equipment (UE) or a terminal) located on a terrestrial site and a communication node (e.g., an airplane, a drone) located on a non-terrestrial place. A service link may be established between the satellite 110 and the communication node 120, and the service link may be a radio link. The satellite 110 may provide communication services to the communication node 120 using one or more beams. The shape of a footprint of the beam of the satellite 110 may be elliptical.

The communication node 120 may perform communications (e.g., downlink communication and uplink communication) with the satellite 110 using LTE technology and/or NR technology. The communications between the satellite 110 and the communication node 120 may be performed using an NR-Uu interface. When dual connectivity (DC) is supported, the communication node 120 may be connected to other base stations (e.g., base stations supporting LTE and/or NR functionality) as well as the satellite 110, and perform DC operations based on the techniques defined in the LTE and/or NR specifications.

The gateway 130 may be located on a terrestrial site, and a feeder link may be established between the satellite 110 and the gateway 130. The feeder link may be a radio link. The gateway 130 may be referred to as a 'non-terrestrial network (NTN) gateway'. The communications between the satellite 110 and the gateway 130 may be performed based on an NR-Uu interface or a satellite radio interface (SRI). The gateway 130 may be connected to the data network 140. There may be a 'core network' between the gateway 130 and the data network 140. In this case, the gateway 130 may be connected to the core network, and the core network may be connected to the data network 140. The core network may support the NR technology. For example, the core network may include an access and mobility management function (AMF), a user plane function (UPF), a session management function (SMF), and the like. The communications between the gateway 130 and the core network may be performed based on an NG-C/U interface.

Alternatively, a base station and the core network may exist between the gateway 130 and the data network 140. In this case, the gateway 130 may be connected with the base station, the base station may be connected with the core network, and the core network may be connected with the data network 140. The base station and core network may support the NR technology. The communications between the gateway 130 and the base station may be performed based on an NR-Uu interface, and the communications between the base station and the core network (e.g., AMF, UPF, SMF, and the like) may be performed based on an NG-C/U interface.

Figure 2:
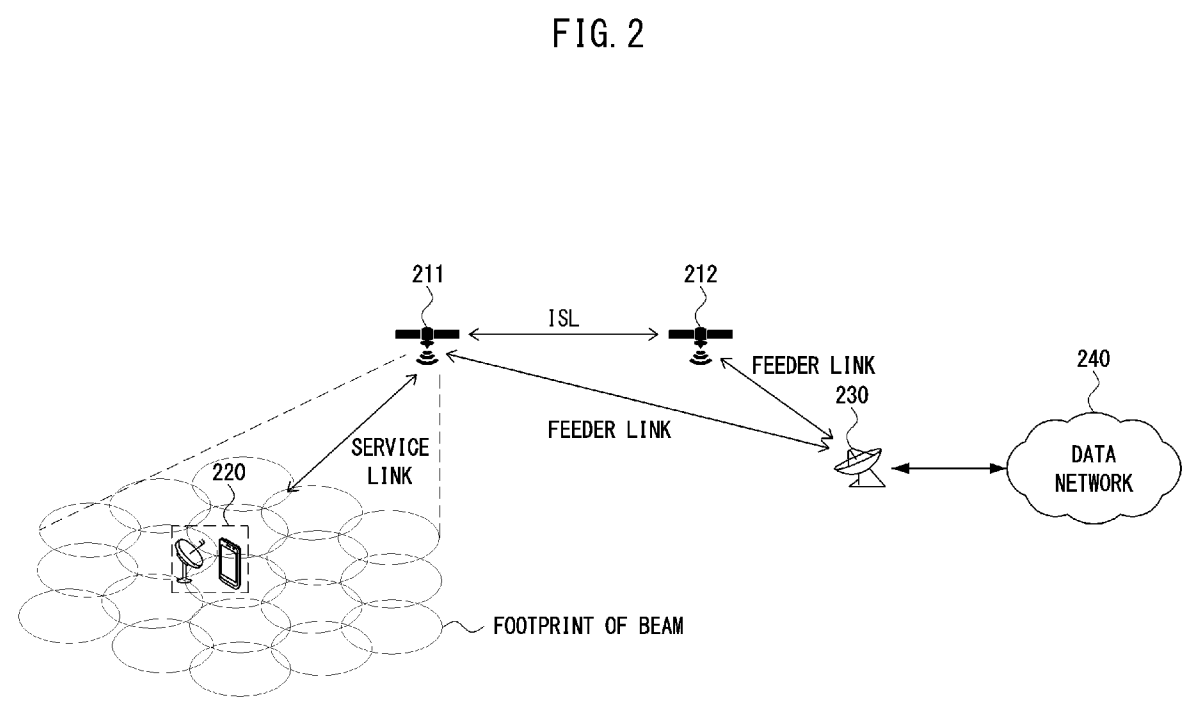

FIG. 2 is a conceptual diagram illustrating a second exemplary embodiment of a non-terrestrial network.

Referring to FIG. 2, a non-terrestrial network may include a first satellite 211, a second satellite 212, a communication node 220, a gateway 230, a data network 240, and the like. The NTN shown in FIG. 2 may be a regenerative payload based NTN. For example, each of the satellites 211 and 212 may perform a regenerative operation (e.g., demodulation, decoding, re-encoding, re-modulation, and/or filtering operation) on a payload received from other entities (e.g., the communication node 220 or the gateway 230), and transmit the regenerated payload.

Each of the satellites 211 and 212 may be a LEO satellite, a MEO satellite, a GEO satellite, a HEO satellite, or a UAS platform. The UAS platform may include a HAPS. The satellite 211 may be connected to the satellite 212, and an inter-satellite link (ISL) may be established between the satellite 211 and the satellite 212. The ISL may operate in an RF frequency band or an optical band. The ISL may be established optionally. The communication node 220 may include a terrestrial communication node (e.g., UE or terminal) and a non-terrestrial communication node (e.g., airplane or drone). A service link (e.g., radio link) may be established between the satellite 211 and communication node 220. The satellite 211 may provide communication services to the communication node 220 using one or more beams.

The communication node 220 may perform communications (e.g., downlink communication or uplink communication) with the satellite 211 using LTE technology and/or NR technology. The communications between the satellite 211 and the communication node 220 may be performed using an NR-Uu interface. When DC is supported, the communication node 220 may be connected to other base stations (e.g., base stations supporting LTE and/or NR functionality) as well as the satellite 211, and may perform DC operations based on the techniques defined in the LTE and/or NR specifications.

The gateway 230 may be located on a terrestrial site, a feeder link may be established between the satellite 211 and the gateway 230, and a feeder link may be established between the satellite 212 and the gateway 230. The feeder link may be a radio link. When the ISL is not established between the satellite 211 and the satellite 212, the feeder link between the satellite 211 and the gateway 230 may be established mandatorily.

The communications between each of the satellites 211 and 212 and the gateway 230 may be performed based on an NR-Uu interface or an SRI. The gateway 230 may be connected to the data network 240. There may be a core network between the gateway 230 and the data network 240. In this case, the gateway 230 may be connected to the core network, and the core network may be connected to the data network 240. The core network may support the NR technology. For example, the core network may include AMF, UPF, SMF, and the like. The communications between the gateway 230 and the core network may be performed based on an NG-C/U interface.

Alternatively, a base station and the core network may exist between the gateway 230 and the data network 240. In this case, the gateway 230 may be connected with the base station, the base station may be connected with the core network, and the core network may be connected with the data network 240. The base station and the core network may support the NR technology. The communications between the gateway 230 and the base station may be performed based on an NR-Uu interface, and the communications between the base station and the core network (e.g., AMF, UPF, SMF, and the like) may be performed based on an NG-C/U interface.

Meanwhile, entities (e.g., satellites, communication nodes, gateways, etc.) constituting the NTNs shown in FIGS. 1 and 2 may be configured as follows.

FIG. 3 is a block diagram illustrating a first exemplary embodiment of an entity constituting a non-terrestrial network.

Referring to FIG. 3, an entity 300 may include at least one processor 310, a memory 320, and a transceiver 330 connected to a network to perform communication. In addition, the entity 300 may further include an input interface device 340, an output interface device 350, a storage device 360, and the like. The components included in the entity 300 may be connected by a bus 370 to communicate with each other. However, each component included in the entity 300 may be connected to the processor 310 through a separate interface or a separate bus instead of the common bus 370. For example, the processor 310 may be connected to at least one of the memory 320, the transceiver 330, the input interface device 340, the output interface device 350, and the storage device 360 through a dedicated interface.

The processor 310 may execute at least one instruction stored in at least one of the memory 320 and the storage device 360. The processor 310 may refer to a central processing unit (CPU), a graphics processing unit (GPU), or a dedicated processor on which the methods according to the exemplary embodiments of the present disclosure are performed. Each of the memory 320 and the storage device 360 may be configured as at least one of a volatile storage medium and a nonvolatile storage medium. For example, the memory 320 may be configured with at least one of a read only memory (ROM) and a random access memory (RAM).

Meanwhile, scenarios in the NTN may be defined as shown in Table 1 below.

TABLE 1

|  | NTN shown in FIG. 1 | NTN shown in FIG. 2 |
|---|---|---|
| GEO | Scenario A | Scenario B |
| LEO (steerable beams) | Scenario C1 | Scenario D1 |
| LEO (beams moving with satellite) | Scenario C2 | Scenario D2 |

When the satellite 110 in the NTN shown in FIG. 1 is a GEO satellite (e.g., a GEO satellite that supports a transparent function), this may be referred to as 'scenario A'. When the satellites 211 and 212 in the NTN shown in FIG. 2 are GEO satellites (e.g., GEOs that support a regenerative function), this may be referred to as 'scenario B'.

When the satellite 110 in the NTN shown in FIG. 1 is an LEO satellite with steerable beams, this may be referred to as 'scenario C1'. When the satellite 110 in the NTN shown in FIG. 1 is an LEO satellite having beams moving with the satellite, this may be referred to as 'scenario C2'. When the satellites 211 and 212 in the NTN shown in FIG. 2 are LEO satellites with steerable beams, this may be referred to as 'scenario D1'. When the satellites 211 and 212 in the NTN shown in FIG. 2 are LEO satellites having beams moving with the satellites, this may be referred to as 'scenario D2'.

Parameters for the scenarios defined in Table 1 may be defined as shown in Table 2 below.

TABLE 2

|  | Scenarios A and B | Scenarios C and D |
|---|---|---|
| Altitude | 35,786 km | 600 km |
|  |  | 1,200 km |
| Spectrum (service link) | <6 GHz (e.g., 2 GHz) | |
|  | >6 GHz (e.g., DL 20 GHz, UL 30 GHz) | |
| Maximum channel bandwidth capability (service link) | 30 MHz for band < 6 GHz | |
|  | 1 GHz for band > 6 GHz | |
| Maximum distance between satellite and communication node (e.g., UE) at the minimum elevation angle | 40,581 km | 1,932 km (altitude of 600 km) |
|  |  | 3,131 km (altitude of 1,200 km) |
| Maximum round trip delay (RTD) (only propagation delay) | Scenario A: 541.46 ms (service and feeder links) | Scenario C: (transparent payload: service and feeder links) |
|  | Scenario B: 270.73 ms (only service link) | −5.77 ms (altitude of 600 km) |
|  |  | −41.77 ms (altitude of 1,200 km) |

TABLE 2-continued

| | Scenarios A and B | Scenarios C and D |
|---|---|---|
| | | Scenario D: (regenerative payload: only service link) −12.89 ms (altitude of 600 km) −20.89 ms (altitude of 1,200 km) |
| Maximum delay variation within a single beam | 16 ms | 4.44 ms (altitude of 600 km) 6.44 ms (altitude of 1,200 km) |
| Maximum differential delay within a cell | 10.3 ms | 3.12 ms (altitude of 600 km) 3.18 ms (altitude of 1,200 km) |
| Service link | NR defined in 3GPP | |
| Feeder link | Radio interfaces defined in 3GPP or non-3GPP | |

In addition, in the scenarios defined in Table 1, delay constraints may be defined as shown in Table 3 below.

TABLE 3

| | Scenario A | Scenario B | Scenario C1-2 | Scenario D1-2 |
|---|---|---|---|---|
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

Meanwhile, a large number of LEO satellites have been launched for non-terrestrial networks. And, within years, more LEO satellites could be launched by global companies (e.g., OneWeb, Space-X, Telesat, and Amazon). However, as the number of satellites increases, network performance may significantly decrease due to inter-satellite interference. In order to solve this problem, clustered satellite communication networks in which a plurality of satellite clusters communicate with a plurality of terminals can be considered in the present disclosure. The present disclosure may propose two types of satellite clusters. In addition, the present disclosure may propose a $3^{rd}$ generation partnership project (3GPP)-based network architecture for realizing a satellite cluster form.

Figure 4:
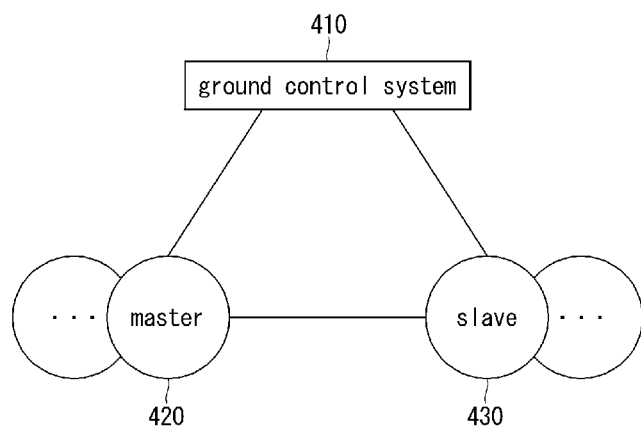
FIG. 4 is a conceptual diagram illustrating a satellite cluster system according to the first exemplary embodiment.

FIG. 4 is a conceptual diagram illustrating a satellite cluster system according to the first exemplary embodiment.

With reference to FIG. 4, the satellite cluster system may include a ground control system 410, at least one master satellite 420, and at least one slave satellite 430. As such, the satellite cluster system is composed of one or more master satellites 420 and one or more slave satellites 430 to operate as if the entire satellites are one large satellite.

Meanwhile, the ground control system 410 may operate to maintain the positions of the at least one master satellite 420 and the at least one slave satellite 430 in the satellite cluster system at appropriate points. The ground control system 410 may also provide a control signal or an information signal to the master satellite 420. Accordingly, the master satellite 420 may receive the control signal or the information signal from the ground control system 410. In addition, the master satellite 420 may play an important role in cooperative transmission of the satellite cluster system by sharing the received control signal and information signal with the slave satellite 430. Information exchange between the master and slave satellites 420 and 430 may be accomplished through an inter-satellite link. The physical layer of the inter-satellite link may be composed of radio frequency (RF) communication or visible light (optical) communication. Accordingly, the master satellite 420 may have a powerful on-board processor for inter-satellite communication and routing. Meanwhile, the slave satellite 430 may passively follow the instruction of the master satellite 420 and operate for the purpose of improving the performance of the satellite cluster system. Such a satellite cluster system may be classified into a single-altitude satellite cluster system and a multi-altitude satellite cluster system according to whether the satellite cluster system has a single altitude.

Figure 5:
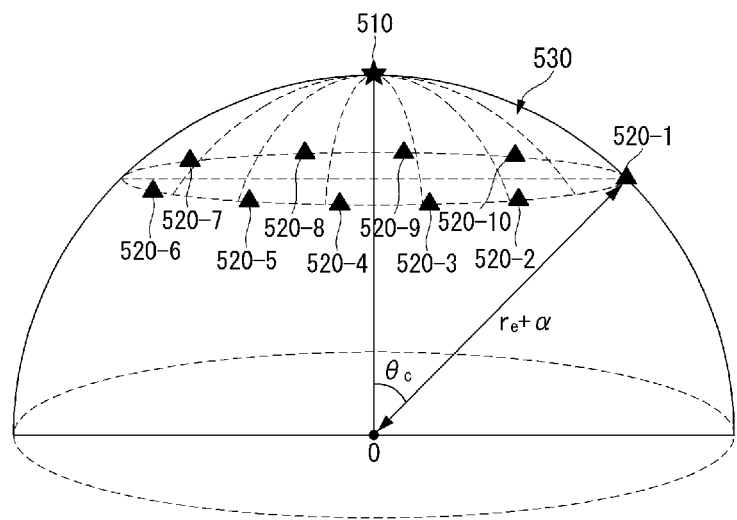
FIG. 5 is a conceptual diagram illustrating a single altitude satellite cluster system according to the first exemplary embodiment.

FIG. 5 is a conceptual diagram illustrating a single altitude satellite cluster system according to the first exemplary embodiment.

With reference to FIG. 5, in a single altitude satellite cluster system, all satellites 510 and 520-1 to 520-10 constituting the satellite cluster system may have the same altitude. The single altitude satellite cluster system may have a spherical cap shaped cluster region 530 and may be a circular satellite cluster system. In FIG. 5, $r_e$ may be the radius of the earth, α may be the altitude, $θ_c$ may be the polar angle of the satellite cluster system (polar angle), and O may be the center of the earth. In the circular satellite cluster system, the master satellite 510 may be located at the center of the satellite cluster system, and the slave satellites 520-1 to 520-10 may be separated by the same distance from the master satellite 510 to maintain a certain distance. In such a circular satellite cluster system, a distance between the master satellite 510 and each of the slave satellites 520-1 to 520-10 may be identical with each other. As a result, the distance of the link between the master satellite 510 and each of the slave satellites 520-1 to 520-10 may be identical to each other in the circular satellite cluster system. Accordingly, in the circular satellite cluster system, it is advantageous for the satellites 510 and 520-1 to 520-10 easily achieve time synchronization.

Meanwhile, in the circular satellite cluster system, the slave satellites 520-1 to 520-10 may be spaced apart from each other by a certain distance. As a result, in the circular satellite cluster system, it may be easy for the master satellite 510 to align an antenna for radio frequency communication or a lens for visible light communication toward the slave satellites 520-1 to 520-10. Equally, in the circular satellite cluster system, it may be easy for each of the slave satellites 520-1 to 520-10 to align an antenna for radio frequency communication or a lens for visible light communication toward the master satellite 510. However, in the case where the number of slave satellites 520-1 to 520-10 increases in the circular satellite cluster system, the distance between the slave satellites 520-1 to 520-10 becomes narrower, making it difficult to deploy the slave satellites 520-1 to 520-10 in a ring-shaped space.

Figure 6:
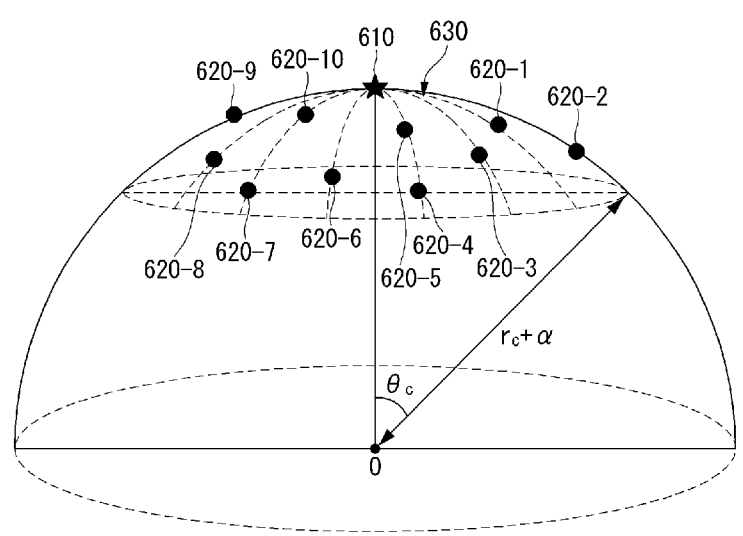
FIG. 6 is a conceptual diagram illustrating a single altitude satellite cluster system according to a second exemplary embodiment.

FIG. 6 is a conceptual diagram illustrating a single altitude satellite cluster system according to a second exemplary embodiment.

With reference to FIG. 6, in a single altitude satellite cluster system, all satellites 610 and 620-1 to 620-10 constituting the satellite cluster system may have the same altitude. The single altitude satellite cluster system may have a spherical cap shaped cluster region 630 and may be a uniform satellite cluster system. In FIG. 6, $r_e$ may be the radius of the earth, $\alpha$ may be the altitude, $\theta_c$ may be the polar angle of the satellite cluster system (polar angle), and O may be the center of the earth.

In the uniform satellite cluster system, the master satellite 610 may be located at the center of the satellite cluster system, and the slave satellites 620-1 to 620-10 may be uniformly distributed in the cluster area. Unlike the circular satellite cluster system, the distance between the master satellite 610 and each of the slave satellites 620-1 to 620-10 may be different from each other in the uniform satellite cluster system. As a result, the distance of the link between the master satellite 610 and each of the slave satellites 620-1 to 620-10 may be different from each other in the uniform satellite cluster system. Accordingly, in the uniform satellite cluster system, it may be difficult for the satellites 610 and 620-1 to 620-10 to achieve time synchronization.

Meanwhile, in the uniform satellite cluster system, it may not be possible for the slave satellites 620-1 to 620-10 to be spaced apart from each other by a constant. As a result, in the uniform satellite cluster system, it may not be easy for the master satellite 610 to align an antenna for radio frequency communication or a lens for visible light communication toward the slave satellites 620-1 to 620-10. Equally, in a uniform satellite cluster system, it may not be easy for each of the slave satellites 620-1 to 620-10 to align an antenna for radio frequency communication or a lens for visible light communication toward the master satellite 610. However, in the case where the number of slave satellites 620-1 to 620-10 increases in the uniform satellite cluster system, it may become easy to deploy the slave satellites 620-1 to 620-10 in the cluster area 630 of a spherical cap shape. As such, the uniform satellite cluster system is advantageous in terms of obtaining performance gain with the deploy of more satellites by arranging the slave satellites 620-1 to 620-10 efficiently in the cluster area when the number of slave satellites 620-1 to 620-10 is large.

Figure 7:
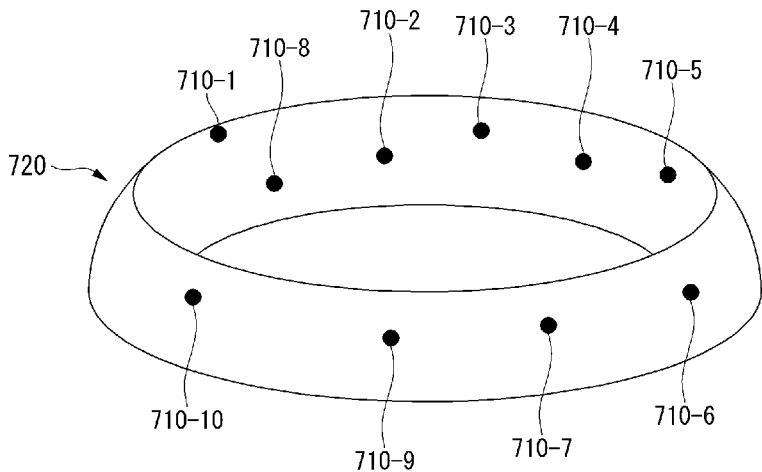
FIG. 7 is a conceptual diagram illustrating a multi-altitude satellite cluster system according to the first exemplary embodiment.

FIG. 7 is a conceptual diagram illustrating a multi-altitude satellite cluster system according to the first exemplary embodiment.

With reference to FIG. 7, in a multi-altitude satellite cluster system, all satellites 710-1 to 710-10 in the satellite cluster system may have different altitudes. The multi-altitude satellite cluster system may have a circular band cluster region 720 and may be a circular band satellite cluster system. Such a multi-altitude satellite cluster may require a complex ground control system to maintain a constant between the satellites 710-1 to 710-10 in the cluster.

Figure 8:
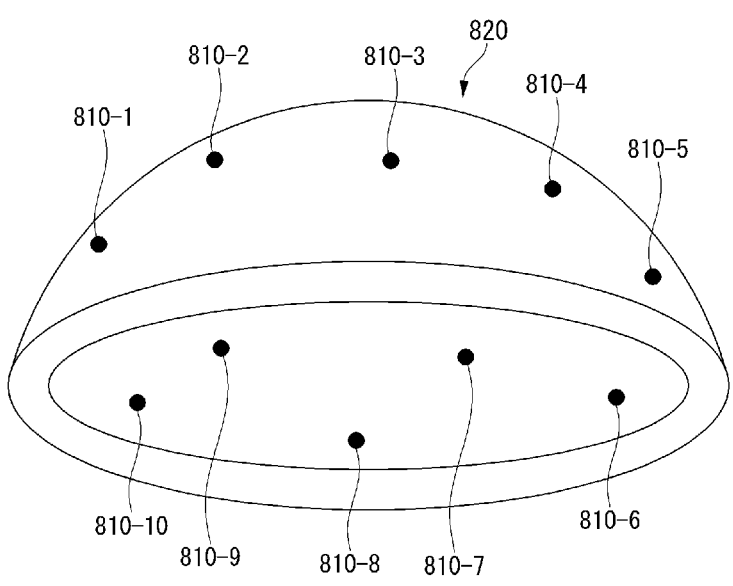
FIG. 8 is a conceptual diagram illustrating a multi-altitude satellite cluster system according to the second exemplary embodiment.

FIG. 8 is a conceptual diagram illustrating a multi-altitude satellite cluster system according to the second exemplary embodiment.

With reference to FIG. 8, in the multi-altitude satellite cluster system, all satellites 810-1 to 820-10 in the satellite cluster system may have different altitudes. The multi-altitude satellite cluster may have a cluster region 820 in the shape of a spherical shell and may be a spherical shell satellite cluster system. Such a multi-altitude satellite cluster system may require a complex ground control system to maintain a constant distance between the satellites 810-1 to 810-10 in the cluster.

Meanwhile, the satellite cluster systems of FIGS. 4 to 8 use a joint transmission (JT) method and a dynamic point selection (DPS) method, which are cooperative multi-point (CoMP) transmission and reception technologies proposed by 3GPP. Here, the joint transmission method may be a technique in which all satellites in the satellite cluster system simultaneously transmit signals to one user. The joint transmission method may use a maximum ratio transmission (MRT) method and an equal gain transmission (EGT) method as a precoding method. Here, the MRT method may be a method known optimal in a multi-input single-output channel. In the MRT method, a precoding vector $w_{MRT}$ as shown in Equation 1 below may be applied using the amplitude and phase information of each channel.

$$w_{MRT} = \frac{h}{\|h\|} \qquad \text{[Equation 1]}$$

Here, h may be a channel vector and may be $h=[h_1, \ldots, h_N]^T$. And $h_n$ may be a channel of each satellite, $n=[1, \ldots, N]$. N may be the number of satellites constituting the satellite cluster system and may be an integer. $\|.\|$ may mean 2-norm. However, MRT requires that all satellites know the amplitude and satellite information of the channel coefficient and thus strict capacity conditions may be essential for inter-satellite links. In addition, signal amplification may be performed near a saturation level of a power amplifier (PA) in the satellite. Accordingly, further amplification of the signal generated while using the MRT method may cause non-linearity problems in the power amplifier. Meanwhile, the EGC method may be a method capable of compensating only a phase for each channel and forming a beam by giving an equal gain. The EGC method may use a precoding vector $w_{EGT}$ as shown in Equation 2 below.

$$w_{EGT} = \left[\frac{1}{\sqrt{N}}e^{\iota h_1}, \ldots, \frac{1}{\sqrt{N}}e^{\iota h_N}\right]^T \qquad \text{[Equation 2]}$$

If the satellite cluster system uses the EGC method, it is possible to reduce the load on the power amplifier that is required by the satellite. The dynamic point selection method may be a very simple beamforming method of selecting one satellite having the best channel state among the satellites in the satellite cluster system. When the satellite cluster system uses this dynamic point selection method, only one selected satellite may serve the corresponding user, and the remaining satellites may not transmit signals. Therefore, the satellite cluster system can reduce inter-cell interference. This advantage can be exploited to reduce inter-satellite interference in networks where high density satellite cluster systems exist. In addition, since only one satellite selected in the satellite cluster system receives a signal through the inter-satellite link and delivers the signal to the user, it is possible to reduce the requirement for the inter-satellite links.

Meanwhile, the satellite cluster system may have a radio access network (RAN)-based satellite cluster architecture proposed by 3GPP. In such a satellite cluster, all satellites may operate as a base station (e.g., gNB) to provide services to users. Here, the master satellite may have the entire function of the base station (e.g., gNB-CU (central unit)/DU (distributed unit)), and the slave satellite may have some functions of the base station (e.g. gNB-DU). Here, the satellite cluster system may adopt the DU/CU split structure proposed by 3GPP.

Figure 9:
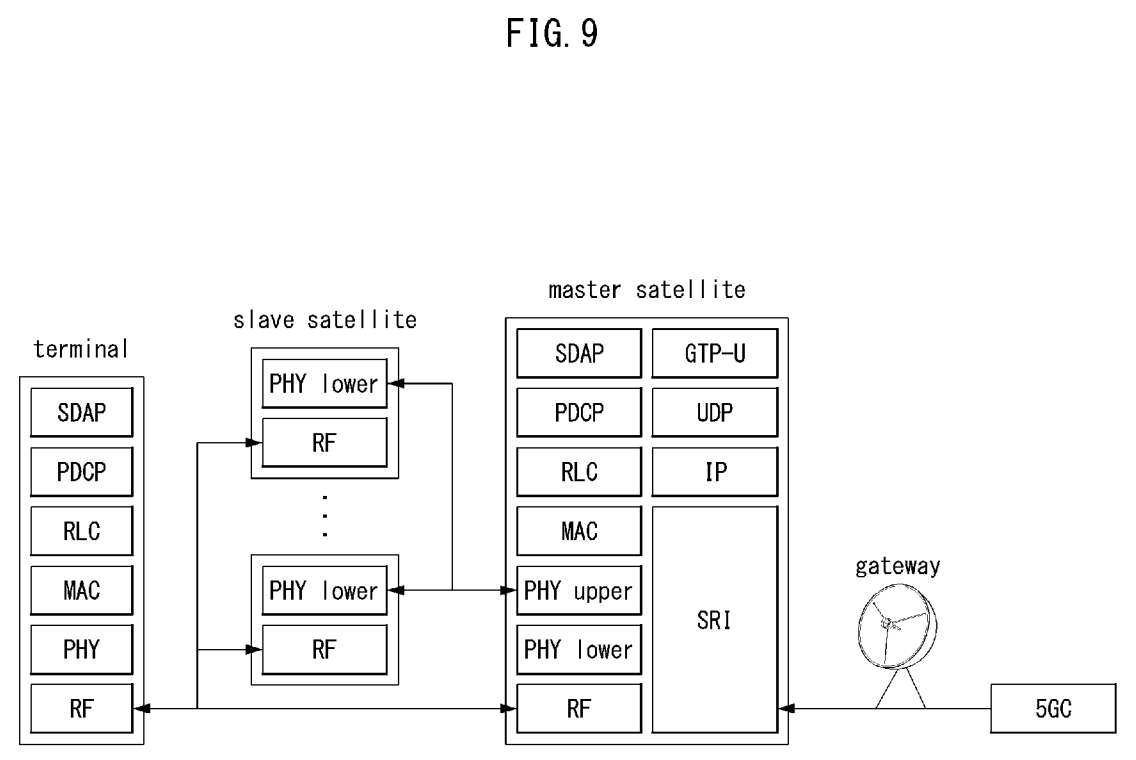

FIG. 9 is a block diagram illustrating a protocol architecture of a satellite cluster system according to the first exemplary embodiment.

With reference to FIG. 9, in the protocol architecture of a satellite cluster system, the master satellite may include a general packet radio service tunneling protocol (GTP)-user (GTP-U) layer, a user datagram protocol (UDP) layer, an Internet protocol (IP) layer, a satellite radio interface (SRI) layer, service data adaption protocol (SDAP) layer, a packet data convergence protocol (PDCP) layer, a radio link control (RLC) layer, a media access control (MAC) layer, an upper portion of a physical (PHY) layer (PHY-upper), a lower portion of a PHY layer (PHY-lower), and a radio frequency (RF) layer. In addition, each slave satellite may include a lower portion of the PHY layer (PHY-lower) and an RF layer. A terminal may include an SDAP layer, a PDCP layer, an RLC layer, a MAC layer, a physical layer, and an RF layer.

As such, the slave satellite may have a lower portion of the PHY layer (PHY-lower) including orthogonal frequency division multiplexing (OFDM) modulation and demodulation, resource element (RE) mapping/demapping, and an RF portion, and the master satellite may have the remaining upper portion of the PHY layer.

The protocol architecture of such a satellite cluster is in structure to that of the distributed antenna system (DAS) of open RAN, which is advantageous in terms of interoperability and cooperation with terrestrial networks on the ground. In addition, the protocol architecture of such a satellite cluster may be optimized to use new radio (NR) features such as CoMP or carrier aggregation (CA), and a slave satellite may be manufactured simply. However, the split of the physical layer for the master satellite and the slave satellite may entail increase of inter-satellite link transmission capacity (e.g., 86 Gbps or more) and very low transmission latency (e.g., less than 100 μs). Accordingly, the protocol architecture of such a satellite cluster system may be applicable when the distance between the master and slave satellites is sufficiently close and a high data rate can be achieved through inter-satellite communication.

Meanwhile, the protocol architecture of the satellite cluster system in which the MAC layer is split (MAC split) may have a structure in which the functionality of the DU/CU is split in the middle of the MAC layer. In this case, the master satellite may be in charge of a radio resource control (RRC) layer, a PDCP layer, an RLC layer, and an upper portion of the MAC layer, and the slave satellite may be in charge of a lower part of the MAC layer, a PHY layer, and an RF portion. The protocol architecture of such a satellite cluster system has a structure aimed at reducing the delay of a hybrid automatic repeat and request (HARD) protocol, and thus is capable of mitigating the constraint of the fronthaul capacity and increasing the reliability. HARQ may be processed in DU. Accordingly, the slave satellite can process its own HARQ process. Therefore, the master satellite can reduce the buffer size. However, since the master satellite distinguishes the interface in the middle of the MAC layer, the interface between CU and DU may become complicated, resulting in incurring disadvantages in that scheduling between CU and DU needs to be additionally defined.

Meanwhile, in the protocol architecture of the satellite cluster system in which the PDCP/RLC is split, the master satellite may be in charge of the RRC layer and the PDCP layer, and the slave satellite may be in charge of the RLC layer, the MAC layer, the PHY layer, and the RF portion. In the protocol architecture of such a satellite cluster system, the slave satellite may mitigate transmission capacity and latency requirements required for the inter-satellite link by directly processing a large part of the base station. In addition, since the protocol architecture of such a satellite cluster system has a structure similar to that currently supporting dual connectivity (DC) and thus can support DC. In the case of a large size of a satellite cluster system, the long distance between the master and slave satellites may cause a large delay and performance degradation on the inter-satellite link. In such a case, the satellite cluster system may use the PDCP/RLC split structure to solve the problem. Meanwhile, the satellite cluster system has drawbacks of implementation complexity of the satellite due to the necessity of configuring the slave satellite to have up to the RLC layer and limitation in cooperative transmission such as CoMP due to the distribution of the MAC layer. Examples and characteristics of the above-mentioned split structure may be shown in Table 4 below.

TABLE 4

| Classification | Requirement | Advantage | Disadvantage | Satellite environment |
|---|---|---|---|---|
| PHY split structure | UplinkData rate: 86.1 Gpbs Downlink Data rate: 86.1 Gpbs Latency: ~100 us | Low installation cost Cost-efficient RRH(remote radio head) Ideal CoMP | Requirement of high front haul capacity Strict latency requirement Subframe level timing between CU and DU | Centralized structure High ISL (inter-satellite links) capacity High datarate requirement Virtual-RAN |
| MAC split structure | Uplink data rate: 3 Gpbs Downlink data rate: 4 Gpbs Latency: ~1 ms | Low front haul capacity requirement low HARQ buffer requirement CoMP available | Scheduling complexity between CU and DU CoMP scheme restriction | Low bandwidth requirement HARQ reliability improvement |

TABLE 4-continued

| Classification | Requirement | Advantage | Disadvantage | Satellite environment |
|---|---|---|---|---|
| PDCP/RLC splitStructure | Uplink data rate: 3 Gpbs Downlink data rate: 4 Gpbs Latency: 1~10 ms | DC availability Low front haul capacity requirement Low latency requirement | PDCP security Restriction of cooperative function | Latency tolerant long distance between master and slave Incomplete/restrictive ISL |

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A satellite cluster system comprising:
at least one slave satellite;
a master satellite sharing a control signal and an information signal with the at least one slave satellite through an inter-satellite link; and
a terrestrial control system for adjusting positions of the master satellite and the at least one slave satellite and transmitting the control signal and the information signal to the master satellite, wherein
the satellite cluster system supports cooperative multi-point (COMP) or carrier aggregation (CA),
when a condition that a link transmission capacity between the master satellite and the at least one slave satellite is equal to or greater than a first threshold is satisfied and a condition that a transmission latency between the master satellite and the at least one slave satellite is less than a second threshold is satisfied,
the master satellite is configured to support upper functions of a physical (PHY) layer and the at least one slave satellite is configured to support lower functions of the PHY layer,
the master satellite supports at least one of a general packet radio service tunneling protocol user (GTP-U) layer, a user datagram protocol (UDP) layer, an Internet protocol (IP) layer, a satellite radio interface (SRI) layer, a service data adaption protocol (SDAP) layer, a packet data convergence protocol (PDCP) layer, a radio link control (RLC) layer, a media access control (MAC) layer or the upper functions of a PHY layer, and
the at least one slave satellite includes a first slave satellite and a second slave satellite, each of the first slave satellite and the second slave satellite supports the lower functions of the PHY layer, including at least one of an orthogonal frequency division multiplexing (OFDM) modulation/demodulation function, a resource element (RE) mapping/demapping function, or a radio frequency (RF) function.

2. The system of claim 1, wherein the inter-satellite link comprises a radio frequency communication or a visual light communication.

3. The system of claim 1, wherein the master satellite and the at least one slave satellite have an identical altitude and form a cluster area in a shape of a spherical cap, the master satellite is positioned at a center of the cluster area, and the master satellite and each slave satellite have an equal distance therebetween.

4. The system of claim 1, wherein the master satellite and the at least one slave satellite have an identical altitude and form a cluster area in a shape of a spherical cap, the master satellite is positioned at a center of the cluster area, the at least one slave satellite is uniformly distributed in the cluster area, and the master satellite and each slave satellite have a different distance therebetween.

5. The system of claim 1, wherein the master satellite and the at least one slave satellite have a different altitude and form a cluster area in a shape of a circular band.

6. The system of claim 1, wherein the master satellite and the at least one slave satellite have a different altitude and form a cluster area in a shape of a spherical shell.

7. The system of claim 1, wherein the master satellite and the at least one slave satellite provide a terminal with a signal using a joint transmission (JT) method or a dynamic point selection (DPS) method, as the cooperative multi-point
(CoMP) communication technology.

* * * * *

18